United States Patent
Ode

(10) Patent No.: US 7,831,975 B2
(45) Date of Patent: Nov. 9, 2010

(54) RESOURCE MANAGING METHOD, RESOURCE MANAGING APPARATUS, RESOURCE MANAGING PROGRAM AND STORAGE MEDIUM FOR MANAGING RESOURCE USAGE RIGHTS IN A FLEXIBLE MANNER

(75) Inventor: Naoki Ode, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1351 days.

(21) Appl. No.: 10/560,021

(22) PCT Filed: Jun. 9, 2004

(86) PCT No.: PCT/JP2004/008409

§ 371 (c)(1), (2), (4) Date: Dec. 8, 2005

(87) PCT Pub. No.: WO2004/111847

PCT Pub. Date: Dec. 23, 2004

(65) Prior Publication Data

US 2007/0094666 A1    Apr. 26, 2007

(30) Foreign Application Priority Data

Jun. 10, 2003   (JP) ............................ P2003-165237

(51) Int. Cl.
   *G06F 9/46* (2006.01)
(52) U.S. Cl. ...................... 718/104; 718/100; 718/102; 718/103
(58) Field of Classification Search .......... 718/102–105, 718/1, 100, 101
See application file for complete search history.

(56) References Cited

U.S. PATENT DOCUMENTS 5,561,784 A * 10/1996 Chen et al. .................. 711/157

(Continued)

FOREIGN PATENT DOCUMENTS

JP     61-288249    12/1986

(Continued)

OTHER PUBLICATIONS

E. Gamma, R. Helm, R. E. Johnson, J. Vlissides: "Design Patterns. Elements of Reusable Object-Oriented Software" Mar. 31, 1995, Addison-Wesley, Reading, Massachusetts (USA), XP002460182 ISBN: 0-201-63361-2.

*Primary Examiner*—Meng-Ai An
*Assistant Examiner*—Abdullah Al Kawsar
(74) *Attorney, Agent, or Firm*—Frommer Lawrence & Haug LLP; William S. Frommer; Ellen Marcie Emas

(57) ABSTRACT

This invention provides a method and an apparatus for allocating resources between applications efficiently and flexibly to permit exclusive, conflict-free resource usage.

When an application APP1 is using a resource, a resource manager (ResMan) may receive a resource acquisition request from an application APP2 (in step S5). The resource manager then determines whether the applications APP1 and APP2 are in conflict with one another about resource usage (in step S6). An acquisition-denied notice is returned to the application APP2 of a lower priority (in step S7). On receiving a request to be notified of release of the resource from the application APP2 (in step S9), followed by the receipt of a notice saying that the resource has been released from the application APP1 (in step S11), the resource manager checks to see if there is any other conflicting request for the resource (in step S15). With no such request detected, the resource manager issues a resource acquisition complete notice to the application APP2 (in step S16).

11 Claims, 4 Drawing Sheets

|   |   | RESOURCES |||||||||||||||
|---|---|---|---|---|---|---|---|---|---|---|---|---|---|---|---|
|   |   | RA | RB | RC | RD | RE | RF | RG | RH | RI | RJ | RK | RL | RM | RN | RO |
| FUNCTIONS | FA |  |  | O |  |  |  |  |  |  |  |  |  |  |  |  |
|  | FB |  |  | O |  |  |  |  |  |  |  |  |  |  |  |  |
|  | FC |  |  | O |  |  |  |  |  |  |  |  |  |  |  |  |
|  | FD |  |  | O |  |  |  |  |  |  |  |  |  |  |  |  |
|  | FE |  | O |  |  |  |  |  |  |  |  |  |  |  |  |  |
|  | FF |  | O |  |  |  |  |  |  |  |  |  |  |  |  |  |
|  | FG |  |  |  |  |  |  | O |  |  |  |  |  |  |  |  |
|  | FH |  |  |  |  |  |  |  | O |  |  |  |  |  |  |  |
|  | FI |  |  |  |  | O |  | O | O | O |  | O |  |  |  |  |
|  | FJ | O |  | O | O | O |  |  |  |  |  |  |  |  |  |  |
|  | FK |  |  |  |  |  | O | O |  | O | O | O | O |  | O |  |
|  | FL |  |  |  |  | O |  | O |  | O |  | O |  | O |  | O |
|  | FM |  |  |  |  | O |  | O |  | O | O |  |  | O | O |  |
|  | FN |  |  | O |  |  |  |  | O | O |  |  | O |  | O |  |

U.S. PATENT DOCUMENTS

| | | | |
|---|---|---|---|
| 5,692,209 A * | 11/1997 | Meaney et al. | 710/244 |
| 6,052,731 A * | 4/2000 | Holdsworth et al. | 709/229 |
| 6,148,414 A * | 11/2000 | Brown et al. | 714/9 |
| 7,284,244 B1 * | 10/2007 | Sankaranarayan et al. | 718/104 |
| 7,526,766 B2 * | 4/2009 | Asai et al. | 718/103 |
| 2002/0078119 A1 * | 6/2002 | Brenner et al. | 709/102 |
| 2003/0014468 A1 * | 1/2003 | Sudhakaran et al. | 709/104 |
| 2004/0023646 A1 * | 2/2004 | Inami et al. | 455/418 |
| 2005/0005272 A1 * | 1/2005 | Moody et al. | 718/104 |
| 2006/0218556 A1 * | 9/2006 | Nemirovsky et al. | 718/104 |

FOREIGN PATENT DOCUMENTS

| | | |
|---|---|---|
| JP | 62-204344 | 9/1987 |
| JP | 2001-356921 | 12/2001 |
| WO | WO 01 84301 | 11/2001 |

* cited by examiner

|  | | RESOURCES | | | | | | | | | | | | | | |
|---|---|---|---|---|---|---|---|---|---|---|---|---|---|---|---|---|
|  | | RA | RB | RC | RD | RE | RF | RG | RH | RI | RJ | RK | RL | RM | RN | RO |
| FUNCTIONS | FA |  |  | O |  |  |  |  |  |  |  |  |  |  |  |  |
|  | FB |  |  | O |  |  |  |  |  |  |  |  |  |  |  |  |
|  | FC |  |  | O |  |  |  |  |  |  |  |  |  |  |  |  |
|  | FD |  |  | O |  |  |  |  |  |  |  |  |  |  |  |  |
|  | FE |  | O |  |  |  |  |  |  |  |  |  |  |  |  |  |
|  | FF |  | O |  |  |  |  |  |  |  |  |  |  |  |  |  |
|  | FG |  |  |  |  |  |  |  | O |  |  |  |  |  |  |  |
|  | FH |  |  |  |  |  |  |  |  | O |  |  |  |  |  |  |
|  | FI |  |  |  | O |  | O |  | O | O |  | O |  |  |  |  |
|  | FJ | O |  | O | O |  |  |  |  |  |  |  |  |  |  |  |
|  | FK |  |  |  |  |  | O | O |  | O | O | O | O |  | O |  |
|  | FL |  |  |  | O |  | O |  | O |  | O |  | O |  |  | O |
|  | FM |  |  |  | O |  | O |  |  | O | O | O |  | O | O |  |
|  | FN |  |  |  |  | O |  |  |  | O | O |  | O |  | O |  |

US 7,831,975 B2

RESOURCE MANAGING METHOD, RESOURCE MANAGING APPARATUS, RESOURCE MANAGING PROGRAM AND STORAGE MEDIUM FOR MANAGING RESOURCE USAGE RIGHTS IN A FLEXIBLE MANNER

TECHNICAL FIELD

The present invention relates to a resource managing method, a resource managing apparatus, a resource managing program, and a storage medium for managing the allocation of hardware resources for electronic equipment.

BACKGROUND ART

There exist a number of methods for averting the conflict of requests to use hardware resources (simply called resources hereunder) from a plurality of executing tasks. Illustratively, one method (called the first method hereunder) involves limiting the right to use resources according to predetermined priority. Another method (the second method) is a so-called single task method that limits the number of executable applications to a single task at any one time. A further method (the third method) involves allowing only the first application that has acquired a resource to utilize those resources at any one time. An even further method (the fourth method) involves implementing by software a layer in which hardware resources are represented by abstract entities so that the resources may be accessed simultaneously on a virtual basis.

Japanese Patent Laid-open No. Hei 9-16416 (FIG. 1) discloses a technique for allocating hardware resources. The disclosed technique involves adjusting, in a multitask processing environment, the waiting times of processing requests for resources depending on the degree of congestion of the requests so that the resources may be allocated preferentially. In other words, processing requests of lower priorities are delayed variably depending on the degree of their congestion so that the resources are allocated preferentially for requests of higher priorities.

However, the first and the second methods above have the disadvantage of entailing restrictions on the performance of applications; a method involving fewer operational constraints is preferred. The third method requires that resource requests have the same priority within the system; any differences that may exist in priority are ignored. If it is desired to allocate resources according to priority by the third method, it is necessary to carry out priority management on the user's responsibility. For the fourth method, a high-performance environment such as a personal computer is mandatory; the scheme involved is too burdensome for devices with limited functions and capabilities such as mobile phones.

DISCLOSURE OF INVENTION

The present invention has been made in view of the above circumstances and provides a resource managing method, a resource managing apparatus, a resource managing program, and a storage medium for managing the allocation of hardware resources between a plurality of applications efficiently and flexibly so as to implement exclusive, conflict-free usage of the resources.

According to one embodiment of the present invention, there is provided a resource managing method including the steps of: accepting a resource acquisition request from any one of a plurality of processing means; determining whether a resource corresponding to the resource acquisition request from that processing means conflicts with the resource to be used by another processing means; deciding which of the processing means found to be in conflict with one another about resource usage should be granted permission to use the resource in question; upon receipt of a request to be notified of release of the resource from the processing means not granted permission to use the resource, cataloging in a list the resource corresponding to the release notification request in conjunction with the release notification-requesting processing means; upon receipt of a notice saying that the resource has been released from the processing means having been granted permission to use the resource, checking from the list the release notification-requesting processing means; and issuing an acquisition complete notice saying that the resource has been acquired to the release notification-requesting processing means checked from the list in the list checking step.

In one preferred variation of the embodiment above, the resource acquisition request may be accepted, presence of conflict between resources may be determined, whether or not to grant permission to use resources may be decided, the resources may be cataloged in the list, the list may be checked, and the acquisition complete notice may be issued, per function representing at least one resource needed to perform a desired process.

According to the present invention, whereas it is the processing means that ultimately acquire resources, the resource managing apparatus exercises management over how to determine presence of conflict between resources, how to decide whether or not to grant permission to use resources, and how to allocate the right to use resources. The processing means that failed to acquire a given resource may request to be notified of release of the resource in question as soon as it occurs. If the processing means that was using the resource has released it and if there is any processing means requesting to be notified of release of the resource in question, the resource managing apparatus issues to the requesting processing means an acquisition complete notice saying that the resource has been released.

That is, the resource managing apparatus of the present invention exercises management over how to determine presence of conflict between resources, how to decide whether or not to grant permission to use resources, and how to allocate the right to use resources. If any processing means that was using a resource has released it and if there is another processing means requesting to be notified of release of that resource, the resource managing apparatus issues to the requesting processing means an acquisition complete notice saying that the resource has been released. This makes it possible to allocate resources efficiently and flexibly between a plurality of processing means (e.g., applications), whereby exclusive, conflict-free resource usage is implemented.

BEST MODE FOR CARRYING OUT THE INVENTION

Preferred embodiments of the present invention will now be described with reference to the accompanying drawings.

Before specific structures of the embodiments are discussed, the scheme of resource management proposed by the present invention will be outlined below.

According to the present invention, hardware resources (simply called resources) are managed in units called functions. A function represents one or more resources that are used to carry out a process desired by an application corresponding to processing means of the present invention. As such, the function is the smallest increment of resource management. Specific functions may include a compressed moving picture reproduction function and a digital camera function representative of the corresponding capabilities of electronic equipment. More specifically, the compressed moving picture reproduction function is arranged to represent a number of resources necessary for reproducing compressed moving pictures. Such resources may include: a data acquisition resource for acquiring compressed moving picture data from a memory or over a communication line; a data expansion resource such as a circuit for expanding the compressed moving picture data; a display resource such as a display device for displaying the moving pictures following their data expansion; and an audio output resource such as speakers for outputting sounds derived from the expanded data. Likewise, the digital camera function is set to represent resources needed to take pictures digitally. These resources may include: a digital camera block for taking pictures; a data compression resource such as a circuit for compressing picture data taken; and a recording resource such as a circuit for recording compressed picture data to a memory. The data handled in conjunction with the above functions each representative of resources is, for example, 32-bit-long bitmap information.

Figures 1, 2:
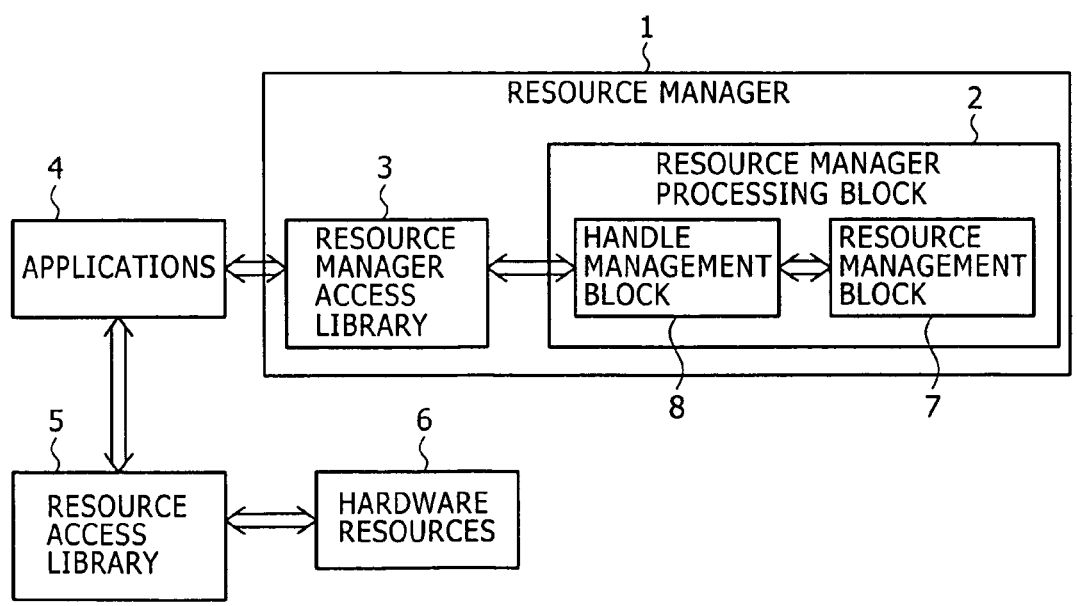
FIG. 1 is a tabular view showing relations of correspondence between functions and resources.
FIG. 2 is a block diagram outlining a structure of electronic equipment that carries out resource management as an embodiment of the present invention.

FIG. 1 is a tabular view showing relations of correspondence between functions and resources. This figure depicts generalized relations between functions and resources. Reference characters FA through FN in a left-hand side column (vertical axis) of FIG. 1 denote individually different functions; reference characters RA through RO in a top row (horizontal axis) represent individually different resources. In FIG. 1, each of the functions in the column is shown to include the resources designated by hollow circles pointing to the top row. More specifically, the functions FA through FD in FIG. 1 are shown associated with the resource RC for their use, and the functions FE and FF with the resource RB. Similarly, the function FG is shown associated for its use with the resource RH, the function FH with the resource RI, the function FI with the resources RE, RG, RI, RJ, and RL; the function FJ with the resources RA, RC, RD, and RE; and the function FK with the resources RF, RG, RI through RL, and RN. Explanations of the functions FL through FN are omitted.

FIG. 2 is a block diagram outlining a structure of electronic equipment that carries out resource management as an embodiment of the present invention. The inventive electronic equipment includes a resource manager 1, applications 4, resources (hardware resources) 6, and a resource access library 5. The resource manager 1 implements the functions of a resource managing apparatus according to the invention. The applications 4 constitute software for use by the electronic equipment in carrying out diverse processes. The resources 6 are made up of various hardware resources incorporated in this electronic equipment. The resource access library 5 serves as an interface that allows the applications 4 to gain access to the resources 6.

The resource manager 1 is a principal block that executes resource management according to the present invention, providing exclusive control over the resources 6 accessible by the applications 4. The resource manager 1 has a resource manager processing block 2 and a resource manager access library 3. The resource manager access library 3 functions as the accepting means and notice issuing means of the present invention. The library 3 thus serves as an interface that allows the applications 4 to access the resource manager processing block 2. Using the resource manager access library 3, the applications 4 may request the right to use resources from the resource manager processing block 2 or may notify the latter of released resources. The resource manager processing block 2 functions as the conflict determining means, deciding means, list cataloging means, and list checking means of the present invention. The resource manager processing block 2 has a handle management block 8 and a resource management block 7 for carrying out resource management per function. The handle management block 8 manages the correspondence between resource handles and functions. The handle management block 8 has a list in which numbers are assigned to the resources requested by the applications 4. The list is used to ascertain which applications are using which resources and to determine conflict between applications about resource usage. The resource management block 7 manages resources per function. More specifically, the handle management block 8 has the table of FIG. 1 defining the relations of correspondence between the functions and the resources. For resource management, the resource management block 7 checks to see which resources are linked to which resource numbers and which resources are represented by which functions. The resource management block 7 further grants permission to use resources to applications. Because the resource manager access library 3, handle management block 8, and resource management block 7 in the resource manager 1 operate in coordinated fashion, these blocks will be treated integrally as the resource manager 1 hereunder.

In the structure of FIG. 2, the applications 4 each can request at least one function. By requesting a function, the application 4 requests the resource manager 1 to acquire the resources to be used by the function in question. If, say, two or more applications 4 request acquisition of resources by requesting functions simultaneously or at different times, the resource manager 1 references the correspondence table of FIG. 1 to compare the functions for coincidence of the resources to be used. Through the comparison, the resource manager 1 determines whether there exists a resource conflict. If the resource manager 1 determines that a resource conflict has occurred, the manager 1 performs a resource conflict resolution process, to be described later. If it is determined that no resource conflict has occurred, the resource manager 1 grants each of the applications 4 permission to use their respective resources.

When acquiring resources, the application 4 informs the resource manager 1 of the function names and priorities of the desired resources, the cause for resource acquisition, access handles, and a process ID. Each application is associated beforehand with priority information constituted by the priority of the application in question, priority of each of the functions involved, and priority of each of the corresponding resources. The resource manager 1 uses the priority information when resolving any resource conflict that may occur. If an attempt to acquire a resource fails or if the right to use the resource is moved, the resource manager 1 utilizing the cause for resource acquisition informs the application 4 requesting the resource in question why the attempt to acquire it has failed or why the right to use it has been moved. The access handles constitute information that is used to access a plurality of functions simultaneously. The process ID is information used to identify the application 4 requesting the resources. With this embodiment, resource acquisition is deemed successful only if all resources for use by all designated functions have been acquired. Any other cases of resource acquisition are considered a failure. In case of a failed attempt to acquire any resource, the corresponding function is released even if some of the requested resources have already been acquired. The resource manager 1 notifies the application 4 of the result of resource acquisition per function.

Any resource that is no longer in use should be released as soon as possible. The resource in question is released by the application 4 having used it so far. In other words, any resource, once acquired, will be released only by the application 4 having acquired it in the past. After releasing a resource, the application 4 notifies the resource manager 1 of release of the resource in question. A resource release complete notice issued at this point includes the access handle and process ID utilized upon acquisition of the resource. While a plurality of functions may be designated simultaneously, the release complete notice is issued per function because the processing is carried out on a function-by-function basis.

An application 4 may issue a resource release notification request asking the resource manager 1 to notify the release of all resources for use by the requested functions. It is possible to designate a plurality of functions in conjunction with each resource release notification request. When all resources for use by all the functions simultaneously designated are released, the resource manager 1 issues the release notice to the application 4 having requested to be notified of release of the resources. When sending the release notification request, the application 4 informs the resource manager 1 of the names of the functions requesting the release notice, release waiting priority, notice waiting priority, access handles, and a process ID. Only when all resources of all designated functions have been released, does the resource manager 1 send the release notice to the application 4. If the resources are not released within the notice waiting time, the resource manager 1 sends a release notification time-out notice to the application 4. A resource waiting state may be canceled by the application 4 that has issued the release notification request, the application 4 effecting the cancellation by informing the resource manager 1 of the access handles and process ID used upon resource acquisition. That is, the waiting state for the release of any resource can only be canceled by the application 4 waiting for the resource to be released.

Upon receipt of a resource release notice, the application 4 should, without delay, request the resource in question or inform the resource manager 1 that the resource is no longer needed. If the application has requested the resource, the resource manager 1 sends a resource release notice to the application of the next notice destination next time the resource is released. If the resource is not needed, the resource manager 1 sends a resource release notice to the application of the next notice destination. If the application 4 fails to indicate whether it needs the resource, the resource manager 1 recognizes a time-out upon elapse of a predetermined time period and regards the resource as unnecessary. In that case, the resource manager 1 sends a resource release notice to the application of the next notice destination. Suppose that upon elapse of a time period designated by the application requesting to be notified of release of the resource, a resource release notice is not received from the application using the resource in question. In such a case, the resource manager 1 cancels the state in which to wait for a release request, and sends a time-out notice to the application requesting to be notified of release of the resource. If there exists a plurality of applications requesting to be notified of release of the resource, a release notice is first given to the application with the higher priority than any other application, and to the application with its notification request made later than any other. That is, the release notice is given first to the application of the highest priority. If there exist a plurality of applications having the same priority, the notice is given to the application that has made its notification request later than any other application.

A plurality of functions may be designated simultaneously by a resource acquisition request, a resource release request, or a release notification request. The process involved is carried out individually with each of the functions, and a notice of the result is issued per function. Where a plurality of functions are designated simultaneously, the result of the process varies from function to function.

Furthermore, the resource manager 1 may perform a "health" check periodically on cataloged applications. If the absence of an application is verified as a result of the health check, the resource manager 1 releases all the resources that have been used by the application in question, and cancels what is being cataloged about that application.

Specific actions taken for control of a resource conflict will now be described individually.

It might happen that upon request by an application 4 for a function, the function includes a resource currently used by another application so that the request to acquire the function leads to a resource conflict. In that case, the resource manager 1 gives the right to use the resource to the application with the higher priority than the other application. If the applications have the same priority, the resource manager 1 gives the right to use the resource to the application that has made the acquisition request most recently. If the right to use the resource has been moved, the resource manager 1 notifies the application using the resource what has caused the removal and waits for a response from the application. The right to use resources is moved typically when a response is returned with regard to a notice of the cause for removing the right or when a resource release request is sent following transmission of the notice of the cause.

Where an application 4 is set to acquire a plurality of functions simultaneously, the resource manager 1 checks to see if any one of the functions cannot be acquired due to a resource conflict. If any one of the functions is found unavailable because of the conflict, the resource manager 1 gives in response a single notice of acquisition failure to the application 4 so as to avoid an unproductive resource release process. In that case, the application 4 stops acquiring the resources for all designated functions. If acquisition of the functions is not hampered by any resource conflict, the resource manager 1 determines whether the resources are acquired for each of the designated functions. The result of the resource acquisition per function is reported to the application 4.

It might happen that while the application 4 is making a resource release notification request and waiting for a response to the request, the resource manager 1 receives from another application another request for the same resource before the response waiting time is over. In that case, the resource manager 1 grants permission to acquire the resource to the application with the higher priority than the other or to the application that made the request later than the other.

It might also happen that a response to a notice of the cause for removing the right to acquire a resource, or a request to release a resource, is not reported within a "release processing time" designated by the application 4 upon requesting acquisition of the resource in question. In such a case, the resource manager 1 sends a "release error" notice to both the application that has made the acquisition request and the application using the resource in question. In case of a release error, the resource manager 1 regards all subsequent acquisition requests as release errors unless and until the resource in question is released.

The data to be communicated between the blocks shown in FIG. 2 will now be explained.

The applications 4 send to the resource manager access library 3 the following data: initial setting request data, stop setting request data, resource acquisition request data for inside-outside synchronization, resource release request data, resource release notification request data, and resource release notification request canceling data. The initial setting request data is composed of data indicating a message receiving method and reception destination pointers. The resource acquisition request data is made up of function group data composed of function names, priority data, acquisition cause data, resource release maximum processing time data, and resource handles. The resource release request data is formed by the resource handles. The resource release notification request data is constituted by the function group data, priority data, and resource handles. The resource release notification request canceling data is constituted by the resource handles. The priority data is indicative of the priorities of acquisition requests and release notification requests. The acquisition cause data denotes the cause for resource acquisition. The resource release maximum processing time data represents the maximum time actually required for the application to release the resource it is using.

The application 4 sends a process ID, message type data, and message data to the handle management block 8. The process ID is specific to the application in question. The message type data includes an initial setting request message, a stop setting request message, an acquisition request message, a release request message, a release notification request message, and a release notification canceling request message. The message data indicates the content of the message corresponding to each of the message types in use. Of the message types, the initial setting request message is a message for cataloging the application in question. The stop setting request message is a message that cancels cataloging of the application. The acquisition request message is used to request acquisition of a function. The release request message is a message for requesting the release of a function. The release notification request message is used to wait for the release of a resource. The release notification canceling request message is a message for canceling the state in which to wait for the release of a resource. The initial setting request message contains a message receiving method and a reception destination pointer. The acquisition request message contains a resource handle, the group of functions to be acquired, the priority of acquisition, the cause for acquisition, a resource release maximum processing time, and the destination to which to send a first message in response to the acquisition of a resource. The release request message contains the resource handle of the resource to be released. The release notification request message contains the resource handle for release notification, the group of functions waiting for the release of a resource, the priority of release notification, and a release notification waiting time. The release notification canceling request message contains the resource handle for canceling release notification.

The handle management block 8 sends resource handle data, message type data, and cause data to the applications 4. The cause data is representative of the cause for a failed request and the reason why a request is generated to release a release request notice. The message type data includes a successful acquisition notification message, an unsuccessful acquisition notification message, a release request notification message, a release notification message, a release notice waiting time-out notification message, and a release error notification message. The successful acquisition notification message is an acquisition request-granted message indicating successful acquisition of a resource. The unsuccessful acquisition notification message is an acquisition-denied message indicating the failed attempt to acquire a resource. The release request notification message is a message that requests implementation of the release of handles. The release notification message indicates that all designated resources have been released. The release notice waiting time-out notification message is a message indicating that a resource has not been released upon elapse of a release notice waiting time. The release error notification message is a message signaling a time-out on the release request made in response to a release notice. This message is given to both the application that requests acquisition of the resource and the application requesting release of the resource.

The handle management block 8 sends a message ID, message type data, function group data, a process ID, priority data, cause data, resource release time data, and release waiting time data to the resource management block 7. The message ID is an identifier that identifies each message. Where there is a message returned in response to a transmitted message, the message ID of the responding message becomes the identifier of the transmitted message. The message type data includes an acquisition request message, a release request message, a not-needed response message, a release notification request message, and a cause response message. The function group data indicates a group of functions. The process ID is an identifier that identifies an application process.

The priority data is data indicating the priorities of an acquisition request and a release notification request. The cause data indicates the cause for resource acquisition. The resource release time data is data denoting the maximum time actually required for the application to release the resource it is using. The release notice waiting time data is data indicative of a time-out period from the time a release notification request is issued until a release notice is received. Of the message types, the acquisition request message is a message that requests acquisition of a function. The release request message is a message for requesting release of a function. The not-needed response message is used to signal that a function group is not needed in response to a received notice indicating the release of that function group. The release notification request message is a message for requesting to be notified of the release of all resources for the designated function. The cause response message is a message issued as a response to a cause notice.

The resource management block 7 sends a message ID, message type data, function group data, a process ID, cause data, cause process data, and cause priority data to the handle management block 8. The message ID is an identifier that identifies each message. As such, the message serves as a message ID for each message transmitted by the handle management block 8. The message type data includes a successful acquisition notification message, an unsuccessful acquisition notification message, a successful release notification message, an unsuccessful release notification message, a cause notification message, a release notification message, a release notice time-out notification message, and a release error notification message. The function group data is data that denotes a function group. The process ID is an identifier that identifies an application process. The cause data is data representative of the causes for failed resource acquisition, for failed release, for generation of a cause notice, and for acquisition of a resource prior to a notice indicating release of the corresponding function. The cause process data is data identifying the process that caused failed resource acquisition, failed release, or generation of a cause notice; or data identifying the process that caused acquisition of a resource prior to a notice indicating release of the corresponding function. The cause priority data is representative of the priority that caused failed resource acquisition, failed release, or generation of a cause notice; or the priority that caused acquisition of a resource prior to a notice indicating release of the corresponding function. Of the message types, the successful acquisition notification message is a message that indicates successful acquisition of a function. The unsuccessful acquisition notification message is a message indicating the failed attempt to acquire a function. The successful release notification message is a message indicative of successful release of a function. The unsuccessful release notification message indicates the failed attempt to release a function. The cause notification message is a message indicating that the right to use a function resource is moved. The release notification message indicates that all resources of the function designated by a release notification request have been released. The release notice time-out notification message is a message indicating a time-out on a release notification request. The release error notification message indicates a time-out on the response to a cause notice stemming from an acquisition request. This message is transmitted in two directions: one in which the cause is signaled, and the other in which acquisition is requested.

Figure 3:
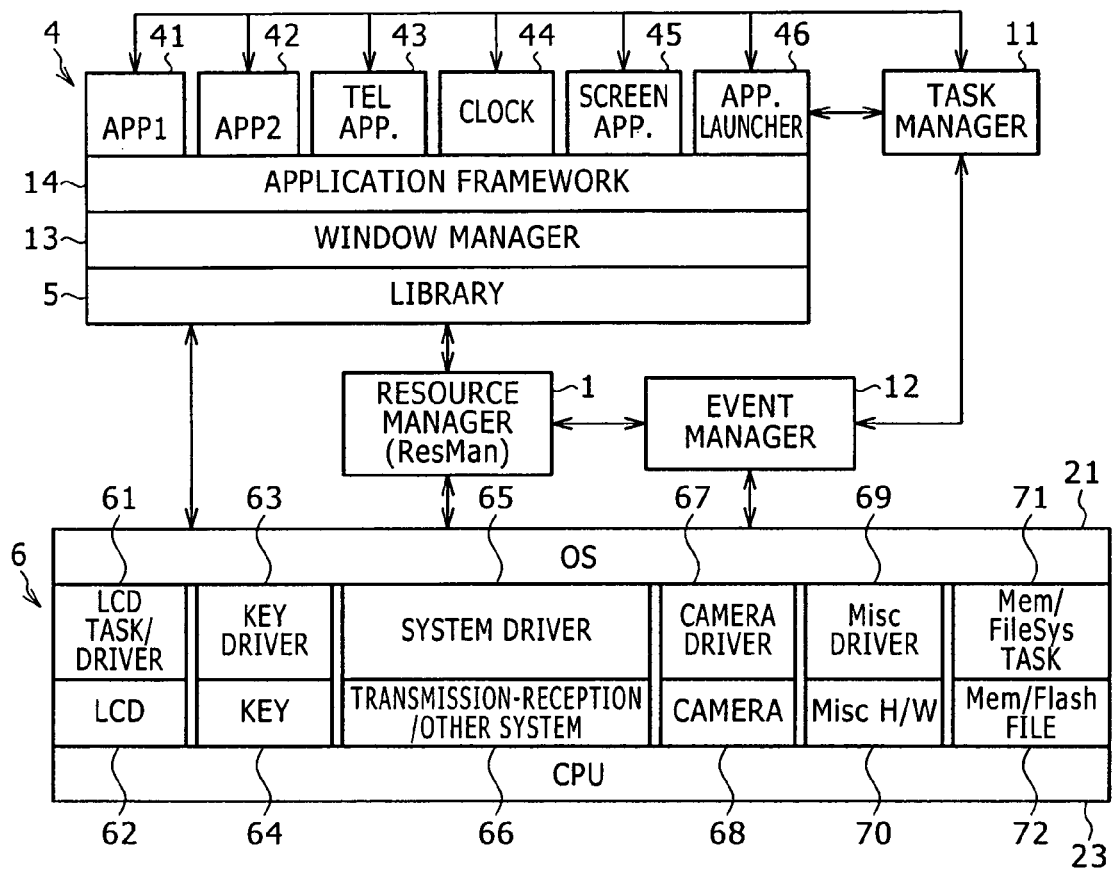
FIG. 3 is a block diagram outlining a structure of a mobile phone terminal as an example of the electronic equipment embodying the present invention.

FIG. 3 is a block diagram outlining a structure of a mobile phone terminal as an example of the electronic equipment embodying the present invention. Of the components in FIG. 3, those shown in FIG. 2 are designated by like reference numerals. The components appearing in FIG. 3 constitute simply a principal structure of the mobile phone terminal.

In the example of FIG. 3, the applications 4 of the mobile phone terminal include: a telephone application 43 that implements the telephone function of the mobile phone terminal; a clock application 44 for implementing a clock function; a screen application 45 for implementing display capabilities and a screen save function; an application launcher 46 for starting an application; and user-defined applications (APP1, APP2) 41 and 42. These applications are connected to an application framework 14, a base for applications. The application framework 14 is in turn connected to a window manager 13. The window manager 13 is connected to an operating system (OS) 21 via the resource access library 5 shown in FIG. 2.

In the example of FIG. 3, the resources 6 include: a liquid crystal display (LCD) device 62 illustratively for providing displays; a driver 61 for driving the device 62; a key device 64 which is typically a ten-key pad; a driver 63 for driving the key device 64; a system device 66 that supports the transmission and reception (communication) capabilities of the mobile phone terminal and other major functions; a driver 65 for driving the system device 66; a camera device 68 that serves as a digital camera; a driver 67 for driving the camera device 68; a memory device (Mem/Flash File) 72 that is a memory serving as a storage medium of the present invention; a driver (Mem/FileSys Task) 71 for writing and reading files to and from the memory device 72; miscellaneous hardware 70 such as LEDs (light-emitting diodes) and an audio device; and miscellaneous drivers 69 for driving the hardware 70. A CPU (central processing unit) 23 controls these devices and performs various operations in conjunction with the devices.

A task manager 11 in FIG. 3 manages tasks during execution of the applications 4. An event manager 12 manages diverse events. A resource manager (ResMan) 1 corresponds to the resource manager 1 shown in FIG. 2.

How the resource manager of the above-described embodiment typically manages resources will now be described with reference to the timing flowcharts of FIGS. 4 through 8.

Figure 4:
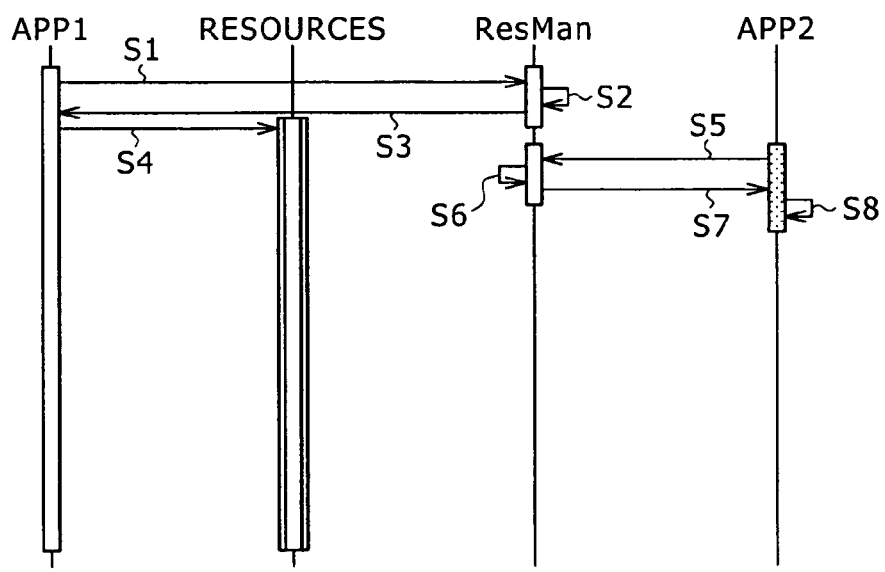
FIG. 4 is a timing flowchart showing how a resource manager manages a conflict between applications APP1 and APP2 about resource usage, the application APP1 being higher in priority than the application APP2, the resource manager receiving no request to be notified of released resources.

FIG. 4 is a timing flowchart showing how the resource manager of the present invention manages a conflict between applications APP1 and APP2 about resource usage, the application APP1 being higher in priority than the application APP2 (APP1>APP2) whereas the application APP1 made a resource acquisition request designating a function earlier than the application APP2. In the example of FIG. 4, the application APP2 does not issue a release notification request.

Referring to FIG. 4, the resource manager illustratively receives in step S1 a new resource acquisition request from the application APP1 designating a function. In step S2, the resource manager determines whether there is a resource conflict. Because the resource to be used by the designated function is not being used by any other application, the resource manager in step S3 returns to the application APP1 permission to acquire the resource. In step S4, the application APP1 acquires the desired resource.

Later in step S5, the resource manager receives a new resource acquisition request from the application APP2 designating a function including the same resource being used. In that case, the resource manager checks in step S6 to determine whether there is a resource conflict. Since the resource desired to be used by the application APP2 is being used already by the application APP1, the resource manager returns in step S7 an unsuccessful acquisition notice to the application APP2. In step S8, the application APP2 carries out an acquisition-denied process following the failed attempt to acquire the desired resource.

Figure 5:
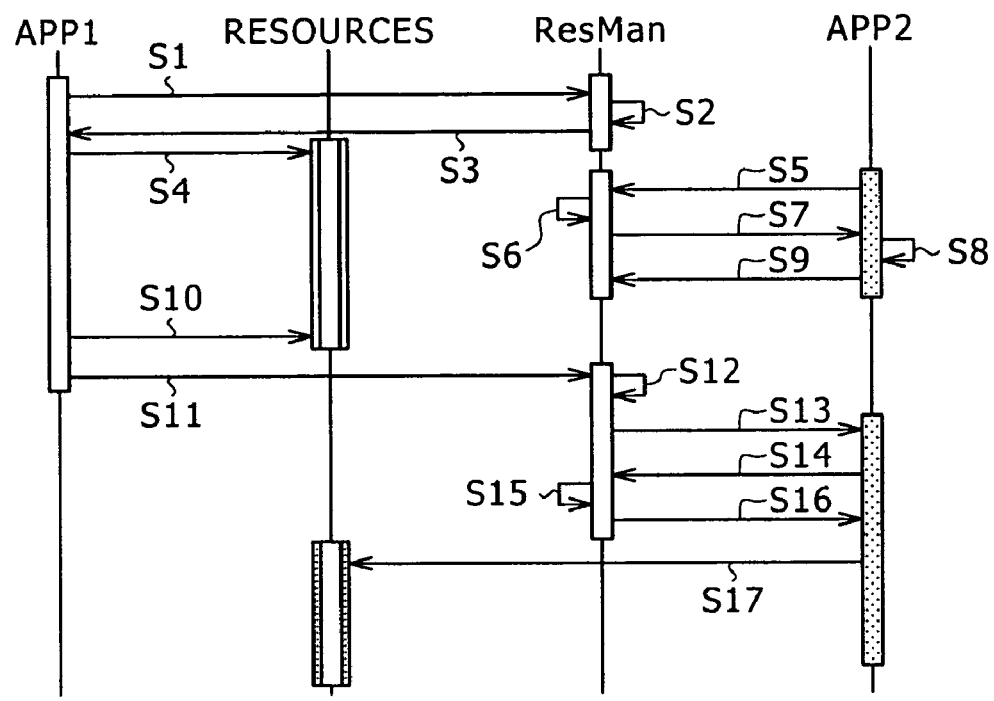
FIG. 5 is a timing flowchart showing how the resource manager manages a conflict between the applications APP1 and APP2 about resource usage, the application APP1 being higher in priority than the application APP2, the resource manager receiving a request to be notified of released resources.

FIG. 5 is a timing flowchart showing how the resource manager of the present invention manages a conflict between the applications APP1 and APP2 about resource usage, the application APP1 being higher in priority than the application APP2 (APP1>APP2) whereas the application APP1 made a resource acquisition request designating a function earlier than the application APP2. In the example of FIG. 5, as opposed to the example of FIG. 4, the application APP2 issues a release notification request. The steps in FIG. 5 which are equivalent to those already discussed in reference to FIG. 4 will not be described further.

In step S8 of FIG. 5, the application APP2 performs the acquisition-denied process, and sends a release notification request to the resource manager. At this point, the resource manager catalogs in a list the function designated by the release notification request in association with the requesting application. Subsequently the application APP1 completes its process and releases the resource in step S10. In step S11, the resource manager receives a release complete notice from the application APP1. In step S12, the resource manager searches for any release notification request coming from any other application. In this case, the release notification request from the application APP2 has been cataloged in the list. Thus the resource manager in step S13 notifies the application APP2 that the resource in question has been released.

When thus informed of the release of the desired resource, the application APP2 goes to step S14 and issues another acquisition request designating the function. After receiving the acquisition request in step S14, the resource manager in step S15 determines whether there is a resource conflict. Because the resource to be used by the designated function is not being used by any other application, the resource manager in step S16 returns an acquisition complete notice to the application APP2. In step S17, the application APP1 acquires the desired resource.

Figure 6:
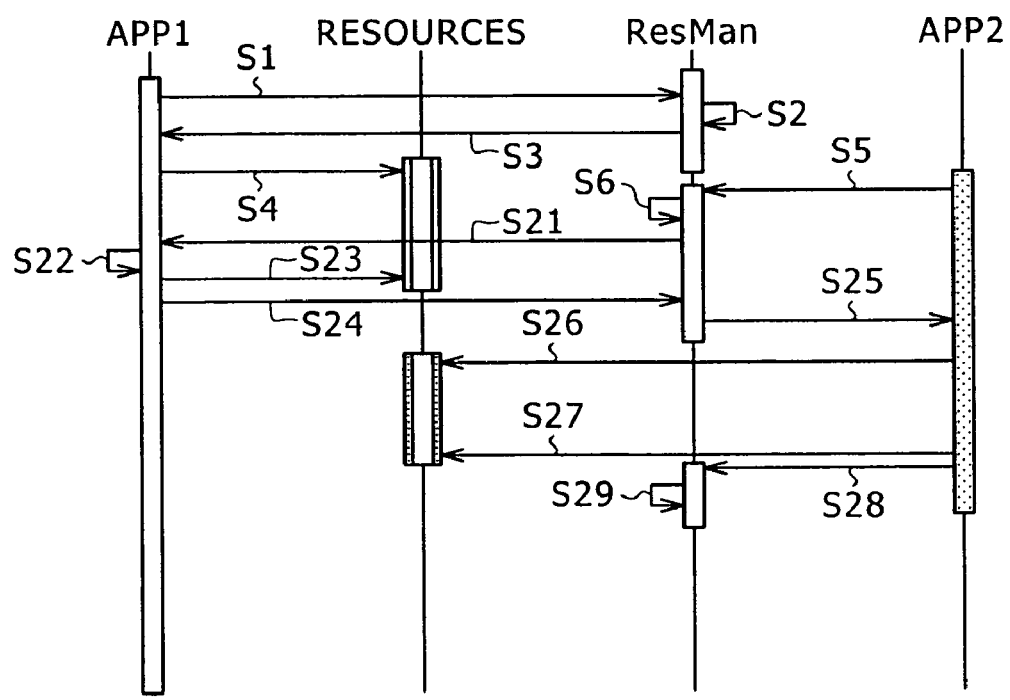
FIG. 6 is a timing flowchart showing how the resource manager manages a conflict between the applications APP1 and APP2 about resource usage, the application APP1 being equal to or lower in priority than the application APP2, the resource manager receiving no request to be notified of released resources.

FIG. 6 is another timing flowchart showing how the resource manager of the present invention manages a conflict between the applications APP1 and APP2 about resource usage. In this case, whereas the application APP1 also made a resource acquisition request designating a function earlier than the application APP2, the application APP1 is equal in priority to the application APP2 so that the application that made the acquisition request later than the other is given the higher priority (APP1≦APP2). In the example of FIG. 6, the application APP1 does not issue a release notification request. The steps in FIG. 6 which are equivalent to those already discussed in reference to FIGS. 4 and 5 will not be described further.

In step S6 of FIG. 6, the resource manager upon determining presence of a resource conflict finds that the application APP2 is equal in priority to the application APP1 and that the application APP1 made the resource acquisition request later than the other application. In that case, the resource manager in step S21 issues a resource release request to the application APP1. On receiving the release request, the application APP1 performs a resource release process in steps S22 and S23. In step S24, the application APP1 sends a release complete notice to the resource manager.

Upon receipt of the release complete notice from the application APP1, the resource manager in step S25 sends an acquisition complete notice to the application APP2. In step S26, the application APP2 acquires the desired resource.

After completing its process, the application APP2 releases the resource in step S27. In step S28, the resource manager receives a release complete notice from the application APP2. In step S29, the resource manager catalogs the released resource in the list.

Figure 7:
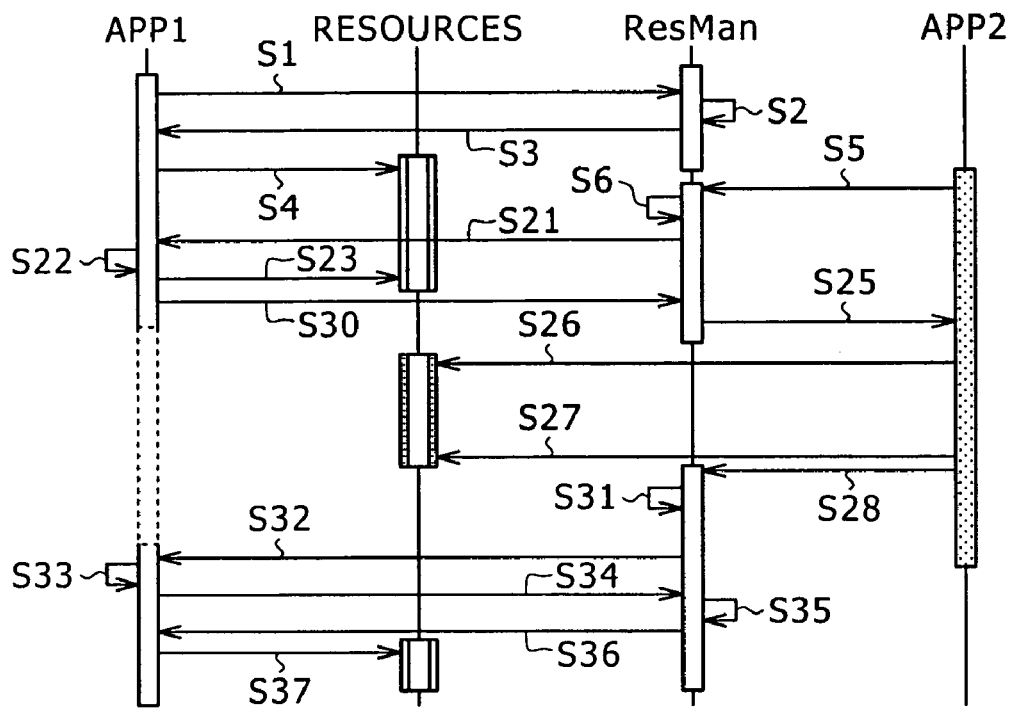
FIG. 7 is a timing flowchart showing how the resource manager manages a conflict between the applications APP1 and APP2 about resource usage, the application APP1 being equal to or lower in priority than the application APP2, the resource manager receiving a request to be notified of released resources.

FIG. 7 is another timing flowchart showing how the resource manager of the present invention manages a conflict between the applications APP1 and APP2 about resource usage. In this case, whereas the application APP1 also made a resource acquisition request designating a function earlier than the application APP2, the application APP1 is equal in priority to the application APP2 so that the application that made the acquisition request later than the other is given the higher priority (APP1≦APP2). In the example of FIG. 7, as opposed to the example of FIG. 6, the application APP1 issues a release notification request. The steps in FIG. 7 which are equivalent to those already discussed in reference to FIGS. 4, 5 and 6 will not be described further.

In step S23 of FIG. 7, the application APP1 releases the resource it has used. In step S30, the application APP1 sends a release complete notice and a release notification request to the resource manager.

Later in step S28, the resource manager receives a release complete notice from the application APP2. In step S31, the resource manager verifies what is contained in the list in which applications are cataloged in wait for the release of resources. From the release waiting list, the resource manager finds that the application APP1 has issued a release notification request. Thus the resource manager in step S32 sends a resource release notice to the application APP1.

After receiving the resource release notice from the resource manager, the application APP1 in step S33 makes preparations for getting cataloged again in the list for another attempt at resource acquisition. With the preparations completed, the application APP1 in step S34 sends an acquisition request to the resource manager.

In step S35, the resource manager determines whether there is a resource conflict. With no conflict detected at this point, the resource manager in step S36 returns an acquisition complete notice to the application APP1. In step S37, the application APP1 acquires the desired resource again.

Figure 8:
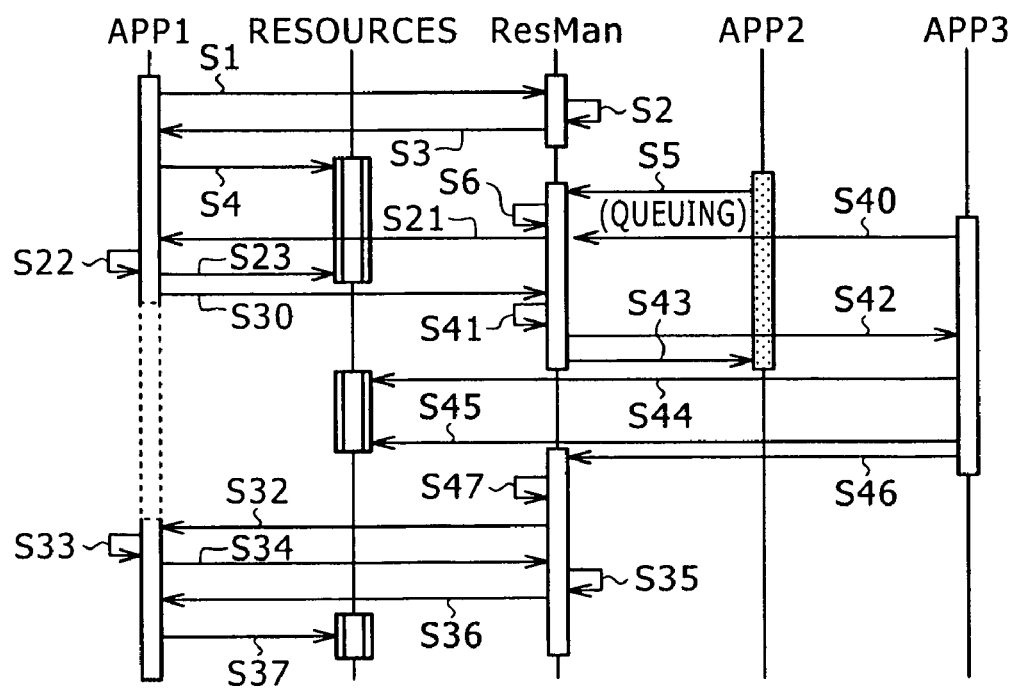
FIG. 8 is a timing flowchart showing how the resource manager manages a conflict among the application APP1, application APP2, and an application APP3 about resource usage, the application APP1 being equal to or lower in priority than the application APP2 which in turn is lower in priority than the application APP3, the resource manager receiving a request to be notified of released resources.

FIG. 8 is a timing flowchart showing how the resource manager of the present invention manages a conflict among the application APP1, application APP2, and an application APP3 about resource usage. More specifically, the example of FIG. 8 assumes that the application APP1 initially made a resource acquisition request, followed by the applications APP2 and APP3 each making the same request in that order. It is also assumed that the application APP3 has a higher priority than the application APP1 or APP2, the latter two being equal in priority. The later the request issued by an application, the higher the priority for that application (APP1≦APP2 <APP3). In the example of FIG. 8, the application APP1 issues a release notification request. The steps in FIG. 8 which are equivalent to those already discussed in reference to FIGS. 4, 5, 6 and 7 will not be described further.

In step S40 of FIG. 8, the application APP3 issues a resource acquisition request, later than the application APP2 having issued its own resource acquisition request in step S5. The resource manager receives the resource acquisition request from the application APP3 in step S40. After receiving a release complete notice and a release notification request from the application APP1 in step S30, the resource manager determines in step S41 whether there is a resource conflict between the applications APP2 and APP3. In this case, the resource manager in step S42 sends an acquisition complete notice to the application APP3 having the highest priority. In step S43, the resource manager sends an unsuccessful acquisition notice to the application APP2. In step S44, the application APP3 acquires the desired resource.

After completing its process, the application APP3 in step S45 releases the resource it has used. In step S46, the application APP3 sends a release complete notice to the resource manager.

Upon receipt of the release complete notice, the resource manager in step S47 verifies what is contained in the release waiting list. From that list, the resource manager finds that the application APP1 has issued a release notification request. Thereafter, the process constituted by steps S32 through S37 in FIG. 7 is carried out.

As explained above, the resource manager embodying the present invention provides a flexible resource management facility by dynamically implementing priority and usage right management in keeping with the current use status (conditions). In other words, the inventive resource manager manages resource usage rights in such a manner that the applications for actually using hardware resources and the applications given the right to use resources may be defined flexibly.

The above-described embodiment introduces the concept of "functions" as units each made up of a plurality of resources necessary for constituting an application among the individual hardware resource as the increment of resource usage rights management. The inventive resource manager thus permits resource management on a function-by-function basis.

The embodiment above has a request queue inside with consideration given to the priorities of applications and resources. Compared with the simplistic last-in-first-out algorithm, the embodiment makes it possible to reduce the number of unproductive resource conflicts.

Although the description above contains many specificities, these should not be construed as limiting the scope of the invention but as merely providing illustrations of the presently preferred embodiment of this invention. It is to be understood that changes and variations may be made without departing from the spirit or scope of the claims that follow.

For example, the invention may be applied not only to mobile phone terminals but also to personal computers and PDAs (Personal Digital Assistants).

With regard to the correspondence table in FIG. 1, information about the function desired by a given application 4 and about the resources corresponding to that functions may be sent by the application 4 in question to the resource manager 1 every time the application 4 issues a resource acquisition request.

Furthermore, the priorities may be applied not only to the applications but also to the functions or to the resources included in each of the functions. In such cases, the resource manager 1 may determine whether there is a resource conflict with respect to a given function or to each of the resources within the function. The resource manager 1 may then issue a resource acquisition complete notice and other notices in view of the result of the resource conflict determination.

The invention claimed is:

1. A resource managing method for use with a resource managing apparatus having a plurality of processing means, said resource managing method performed by the resource managing apparatus comprising the steps of:
   accepting a resource acquisition request from any one of said plurality of processing means;
   determining whether a resource corresponding to said resource acquisition request from said one processing means conflicts with the resource to be used by another processing means based upon a comparison;
   deciding which of the processing means found to be in conflict with one another about resource usage should be granted permission to use the resource in question;
   upon receipt of a request to be notified of release of said resource from the processing means not granted permission to use said resource, cataloging in a list said resource corresponding to the release notification request in conjunction with the release notification-requesting processing means;
   upon receipt of a notice saying that said resource has been released from the processing means having been granted permission to use said resource, checking from said list said release notification-requesting processing means; and
   issuing an acquisition complete notice saying that said resource has been acquired to said release notification-requesting processing means checked from said list in said list checking step,
      wherein a function represents at least one resource needed to perform a desired process and said accepting step accepts said resource acquisition request per function;
   wherein said determining step determines presence of conflict between resources per function.

2. The resource managing method according to claim 1, wherein said deciding step decides whether or not to grant permission to use said resource according to a priority predetermined for each of said processing means.

3. The resource managing method according to claim 1,
   wherein said deciding step decides whether or not to grant permission to use resources per function;
   wherein said list cataloging step catalogs said resources in said list per function;
   wherein said list checking step checks said list per function; and
   wherein said notice issuing step issues said acquisition complete notice per function.

4. The resource managing method according to claim 3, wherein said deciding step decides whether or not to grant permission to use said resources according to a priority predetermined per function.

5. A resource managing apparatus comprising a processor having a plurality of processing means, said resource managing apparatus comprising:
   accepting means for accepting a resource acquisition request from any one of said plurality of processing means;
   conflict determining means for determining whether a resource corresponding to said resource acquisition request from said one processing means conflicts with the resource to be used by another processing means;
   deciding means for deciding which of the processing means found to be in conflict with one another about resource usage should be granted permission to use the resource in question;
   list cataloging means which, upon receipt of a request to be notified of release of said resource from the processing means not granted permission to use said resource, catalogs in a list said resource corresponding to the release notification request in conjunction with the release notification-requesting processing means;
   list checking means which, upon receipt of a notice saying that said resource has been released from the processing means having been granted permission to use said resource, checks from said list said release notification-requesting processing means; and notice issuing means for issuing an acquisition complete notice saying that said resource has been acquired to said release notification-requesting processing means checked from said list by said list checking means, wherein a function represents at least one resource needed to perform a desired process and said accepting means accepts said resource acquisition request per function;

wherein said conflict determining means determines presence of conflict between resources per function.

6. The resource managing apparatus according to claim 5, wherein said deciding means decides whether or not to grant permission to use said resource according to a priority predetermined for each of said processing means.

7. The resource managing apparatus according to claim 5, wherein said deciding means decides whether or not to grant permission to use resources per function;

wherein said list cataloging means catalogs said resources in said list per function;

wherein said list checking means checks said list per function; and wherein said notice issuing means issues said acquisition complete notice per function.

8. The resource managing apparatus according to claim 7, wherein said deciding means decides whether or not to grant permission to use said resources according to a priority predetermined per function.

9. A resource managing apparatus comprising a processor having a plurality of applications, a resource manager access library, and a resource manager processing block;

wherein said resource manager access library comprises: an accepting block for accepting a resource acquisition request from any one of said plurality of applications; and a notice issuing block for issuing an acquisition complete notice saying that a resource has been acquired to any one of said plurality of applications;

wherein said resource manager processing block comprises: a conflict determining block for determining whether the resource corresponding to said resource acquisition request from said application conflicts with the resource to be used by another application; a deciding block for deciding which of the applications found to be in conflict with one another about resource usage should be granted permission to use the resource in question; a list cataloging block which, upon receipt of a request to be notified of release of said resource from the application not granted permission to use said resource, catalogs in a list said resource corresponding to the release notification request in conjunction with the release notification-requesting application; and a list checking block which, upon receipt of a notice saying that said resource has been released from the application having been granted permission to use said resource, checks from said list said release notification-requesting application; and wherein said resource manager access library issues an acquisition complete notice saying that said resource has been acquired to said release notification-requesting application checked from said list by said list checking block, wherein a function represents at least one resource needed to perform a desired process and said accepting block accepts said resource acquisition request per function;

wherein said conflict determining block determines presence of conflict between resources per function.

10. A resource managing program, embodied on a computer storage medium, for execution by a resource managing apparatus having a plurality of processing means, said resource managing program causing said resource managing apparatus to execute a process comprising the steps of:

accepting a resource acquisition request from any one of said plurality of processing means;

determining whether a resource corresponding to said resource acquisition request from said one processing means conflicts with the resource to be used by another processing means;

deciding which of the processing means found to be in conflict with one another about resource usage should be granted permission to use the resource in question;

upon receipt of a request to be notified of release of said resource from the processing means not granted permission to use said resource, cataloging in a list said resource corresponding to the release notification request in conjunction with the release notification-requesting processing means;

upon receipt of a notice saying that said resource has been released from the processing means having been granted permission to use said resource, checking from said list said release notification-requesting processing means; and issuing an acquisition complete notice saying that said resource has been acquired to said release notification-requesting processing means checked from said list in said list checking step, wherein a function represents at least one resource needed to perform a desired process and said accepting step accepts said resource acquisition request per function;

wherein said determining step determines presence of conflict between resources per function.

11. A storage medium which stores a resource managing program readable for execution by a resource managing apparatus having a plurality of processing means, said resource managing program causing said resource managing apparatus to execute a process comprising the steps of:

accepting a resource acquisition request from any one of said plurality of processing means;

determining whether a resource corresponding to said resource acquisition request from said one processing means conflicts with the resource to be used by another processing means;

deciding which of the processing means found to be in conflict with one another about resource usage should be granted permission to use the resource in question;

upon receipt of a request to be notified of release of said resource from the processing means not granted permission to use said resource, cataloging in a list said resource corresponding to the release notification request in conjunction with the release notification-requesting processing means;

upon receipt of a notice saying that said resource has been released from the processing means having been granted permission to use said resource, checking from said list said release notification-requesting processing means; and issuing an acquisition complete notice saying that said resource has been acquired to said release notification-requesting processing means checked from said list in said list checking step, wherein a function represents at least one resource needed to perform a desired process and said accepting step accepts said resource acquisition request per function;

wherein said determining step determines presence of conflict between resources per function.

* * * * *